Nov. 5, 1940.  W. I. BRANIN  2,220,203
CABLE CLAMP
Filed Feb. 27, 1939
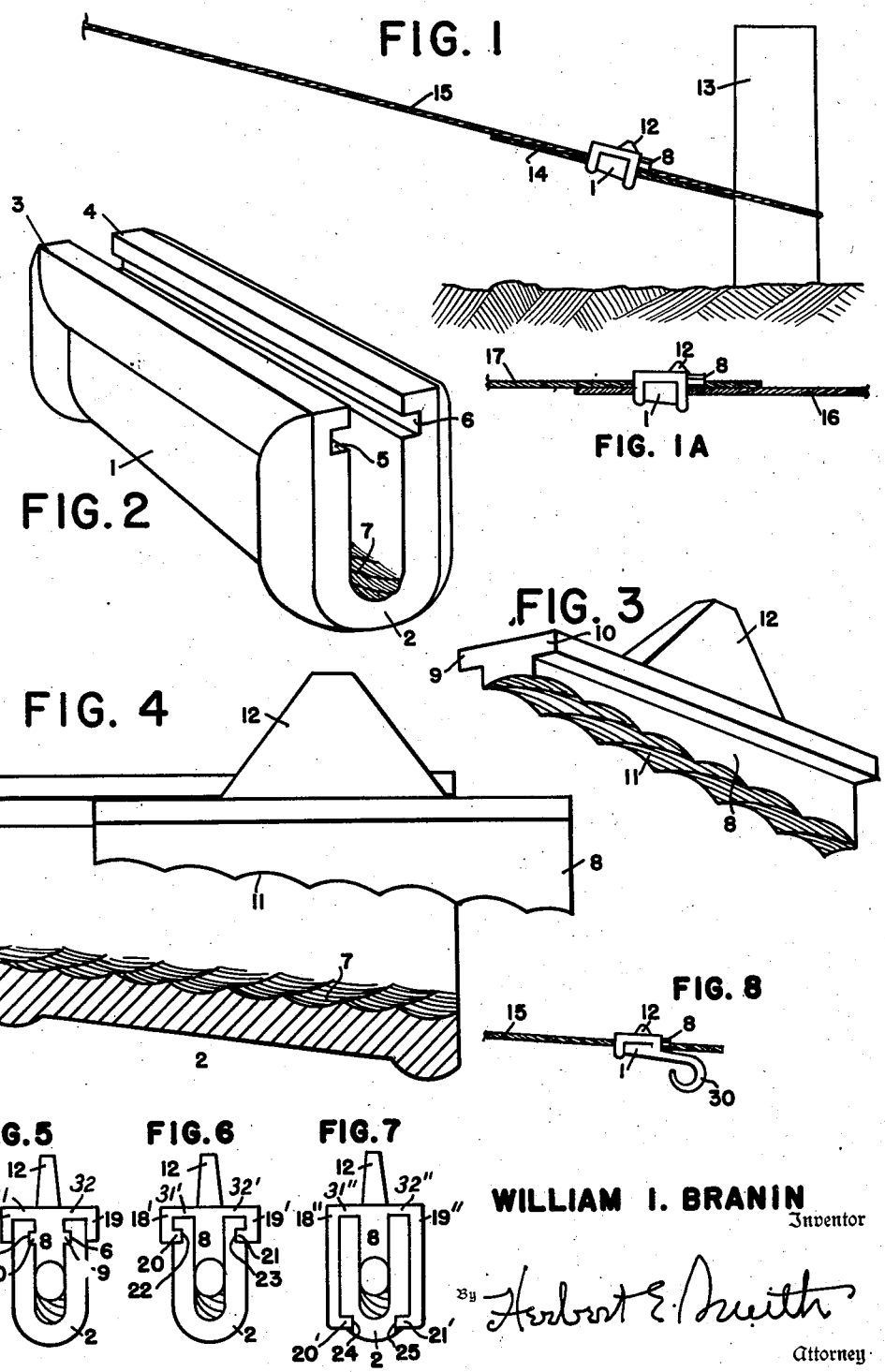
WILLIAM I. BRANIN, Inventor
By Herbert E. Smith, Attorney Patented Nov. 5, 1940

2,220,203

UNITED STATES PATENT OFFICE 2,220,203

CABLE CLAMP

William L. Branin, Wenatchee, Wash.

Application February 27, 1939, Serial No. 258,637

1 Claim. (Cl. 24—136)

My present invention relates to improvements in cable clamps that are particularly suitable for joining the end of a cable to a standing part, in order to form a loop, as when it is desired to anchor the cable. My device may also be used for joining the ends of two cables in a manner in which they are securely and effectively joined so that when it becomes desirable to separate or disjoin the cables, that may be accomplished without undue labor.

In clamping cables it is well known that mechanical clamps employing U-shaped bolts, clamping head, and nuts are very satisfactory for permanent use. The time required to secure the proper gripping action makes them slow and unwieldly for temporary grips.

In many industries and more particularly in logging and construction operations it is customary to anchor a cable for a short time, perform an operation, and then release the cable and move it to a new anchor. In other instances it is desirable to be able to securely grip a cable without distorting it into a loop or bend for anchoring it to a fixed object, or for drawing the cable outwardly from a source as in telephone, telegraph, or power construction operations. To be effective a suitable clamp must not distort or injure the strands of a cable.

It is an object of my invention to provide a cable clamp which may be readily assembled or disassembled and which consists of the minimum number of parts.

It is a further object of my invention to provide a cable clamp which will not injure the strands of the cable which has been clamped.

Another object of my invention has been the provision of a cable clamp which may be modified slightly to serve as a cable anchor.

A still further object of my invention is the provision of a cable clamp which gradually, and in proportion to the strain applied upon the cables, grips the cable uniformly over a large area.

Other objects and advantages of the invention will be apparent during the course of the following description.

In the accompanying drawing, forming a part of this specification, and in which like numerals are employed to designate like parts throughout the same:

Figure 1 is a view illustrating the manner in which an end of a cable may be formed in a loop about an anchor and secured to the standing part and Figure 1A illustrates the manner in which the cable clamp of my invention may be used to splice the ends of two cables and make them as one.

Figure 2 is a perspective view of the clamp box of my device and Figure 3 is a perspective view of the sliding part which cooperates with the clamp box.

Figure 4 is a vertical, cross sectional view of the details of construction of my clamp.

Figures 5, 6, 7, and 8 illustrate modified forms which my invention can take.

The cable clamp in detail is illustrated in Figures 2 and 3 and consists of a cable holder or box element 1 which is formed with a curved web 2 and upstanding flanges 3 and 4 forming a device substantially U-shaped. In the upper, inner faces of the flanges 3 and 4 I have provided slide ways 5 and 6. The inner surface of the web 2 is formed with a series of curved depressions 7 that substantially conform to the rove of a cable.

The sliding part of my device consists of a body portion 8 formed with a pair of flanges 9 and 10 and is substantially T-shaped in cross section. The lower surface of the body 8 has a series of curved depressions 11 to form a cable-engaging surface similar to that of the U-shaped cable holder. Upon the upper surface of the body 8 I form a striker block 12.

In Figure 1 I have indicated a cable looped around an anchor 13. The end 14 of the cable is shown as lying in the bottom of the cable holder 1 and the standing part of the cable 15 is superimposed thereon. The sliding tongue element 8 is indicated in place.

In Figure 1A the cables 16 and 17 are shown as they would appear when they would be spliced together by the device of my invention.

In Figure 5 I indicate the U-shaped box 1 as of a nature of my preferred form except that the sliding part 8 is provided with a pair of laterally extending flanges 31, 32 and a pair of exterior depending flanges 18 and 19 embracing the exterior of the U-shaped box.

Another modified form of my device is shown in Figure 6 wherein the sliding part is provided with a pair of laterally extending flanges 31', 32' and with depending flanges 18' and 19' exterior of the cable holder, which depending flanges have interiorly extending flanges 20 and 21 that slide in ways 22 and 23 respectively on the exterior surface of the U-shaped cable holder.

In Figure 7 is illustrated an additional modification wherein exterior ways 24 and 25 located near the bottom of the box 1 are engaged by flanges 20' and 21' on the depending flanges 18'' and 19'' which last mentioned flanges depend from the lateral flanges 31'', 32''.

The operation of my cable clamp is extremely simple. To secure a cable such as 15 in Figure 1, the end 14 of the cable is passed around an anchor and laid in the bottom of the U-shaped box 1 and as much tension as is possible is applied on the cable 15 by pulling on the end 14. The U-shaped box is then brought into engagement around the cable 15 and the sliding part 8 is inserted into the box so that the flanges 9 and 10 cooperate with the ways 5 and 6 to slide together and gradually or progressively grip the cable. By tipping the striker block 12 with a hammer or other suitable tool sufficient tension will be applied on the cable so that the device will remain together. Further force applied to the cable 15 tends to pull the sliding part 8 into the box 1 further increasing the clamping action.

To splice the ends of a pair of cables such as 16 and 17 in Figure 1A the operation hereinbefore described is followed and as the two cables have a strain put upon them the sliding part 8 of course is drawn into the box 1 more tightly until a perfect grip is obtained.

To remove the clamp from a cable, tension or strain is relieved from the standing part of the cable and a few blows with a hammer on the striker 12 to move it, to the right in Figure 1, will drive the sliding part 8 out of the box and permit removal of the clamp from the cable.

The modified forms shown in Figures 5, 6, and 7 disclose the construction of the device embodying the same principles of the device of Figure 1.

To withstand heavier strains and prevent the spreading of the boxing, the flanges depending from the body portion of the sliding part 8 extend downwardly and parallel to the sides of the box 1, enclosing the flanges 3 and 4.

The device of Figure 8 is a further modification and illustrates the manner in which a box or cable receiving element 1 having the sliding part 8 with its striker block 12 is provided with a hook 30 or other suitable anchor as a ring, thus permitting a cable as 15 to be securely gripped and provide an anchor for the cable without bending it or distorting it and permitting the strain to be taken in a straight line from the anchor.

Having thus fully described my invention, what I claim as new and desire to secure by Letters Patent is:

In a cable clamp, the combination with a U-shaped cable receiving element having longitudinal ways on the interior faces of the legs thereof, the cable receiving surface of said element inclined to the axis of said ways, of a sliding part having a wedge-shaped body portion interposed between the legs of said U-shaped member for securing a cable against said inclined surface outstanding flanges on the body portions engaging said ways, said body portion also having flanges extending laterally across the upper faces of the legs of the U-shaped element and having depending flanges engaging the outer faces of said legs, and a striker block extending upwardly from the outer face of said sliding part.

WILLIAM I. BRANIN.